United States Patent

[11] 3,607,971

| [72] | Inventor | Harry McGrath |
| | | Manchester, England |
| [21] | Appl. No. | 727,014 |
| [22] | Filed | May 6, 1968 |
| [45] | Patented | Sept. 21, 1971 |
| [73] | Assignee | Imperial Chemical Industries Limited |
| | | London, England |
| [32] | Priority | May 10, 1967 |
| [33] | | Great Britain |
| [31] | | 21665/67 |

[54] POLYMERIZATION PROCESS FOR DODECANOLACTAM
9 Claims, No Drawings

| [52] | U.S. Cl. | 260/78 L |
| [51] | Int. Cl. | C08g 20/10 |
| [50] | Field of Search | 260/78 L |

[56] References Cited
UNITED STATES PATENTS

| 3,057,830 | 10/1962 | Corbin | 260/78 L |
| 3,317,482 | 5/1967 | Kunde et al. | 260/78 L |

OTHER REFERENCES

Alien Property Custodian, Application of Paul Schlack, Ser. No. 370,142, Published June 22, 1943 (Abandoned)

Grant, Hackh's Chemical Dictionary (3rd Ed.) McGraw-Hill N.Y. pp. 107– 110 (1944) QD 5H3

*Primary Examiner*—William H. Short
*Assistant Examiner*—L. M. Phynes
*Attorney*—Leonard Horn

ABSTRACT: Dodecanolactam is polymerized by heating with a catalytic amount of a hydrocarbon monosulphonic acid and if desired a chain stopper, especially an N-substituted amide of a stated formula.

POLYMERIZATION PROCESS FOR DODECANOLACTAM

This invention relates to a process for the polymerization of dodecanolactam to produce polydodecanolactam, known in the art as Nylon 12, which is of interest for molding and for spinning into fibers.

It is known to polymerize dodecanolactam by heating it with certain inorganic acid catalysts, particularly phosphoric acid. We have found that when polydodecanolactam produced in presence of phosphoric acid is extracted with water or methanol with the object of removing unpolymerized monomer the extracted product, contrary to expectations, is found to have a lower solution viscosity than the product before extraction. One possible explanation for this anomalous behavior is that the phosphoric acid forms an ionic bond between two or three amine end groups of the polymer, resulting in a high apparent molecular weight and in consequence a high viscosity. Extraction severs some or all of these bonds and removes the phosphoric acid. Whatever the true explanation may be, the anomalous nature of the product makes it difficult to control phosphoric acid catalysed polymerization of dodecanolactam effectively. Results tend to be erratic and the properties of the ultimate product depend greatly upon the reaction conditions, for example the temperature and the duration of heating.

According to the invention a process for the polymerization of dodecanolactam comprises heating dodecanolactam in the presence of a catalytic amount of an organic sulfonic acid.

The organic sulfonic acids which may be used are hydrocarbon sulfonic acids, including arylsulfonic acids, for example benzene, p-toluene or β-naphthalene sulfonic acid; alkylsulfonic acids for example ethylsulfonic acid and cycloalkylsulfonic acids for example cyclohexanesulfonic acid. Monosulfonic acids are preferred.

Suitable amounts of organic sulfonic acid are for example from 0.1 to 3 percent by weight of the dodecanolactam. In general, amounts greater than 1 percent do not cause any great increase in catalytic effect.

The polymerization process may be carried out under conventional conditions, for example in presence of water and at temperatures of 280° to 300° C., if desired in a closed vessel. It is desirable for the heating to be carried out under an oxygen-free atmosphere, for example under nitrogen or carbon dioxide to avoid discoloration of the polymer. Alternatively, the polymerization process may be carried out under anhydrous conditions, for example in a vessel from which all air and water have been removed by boiling a suitable solvent, e.g. toluene, in the vessel, or by evacuating the vessel and flushing with inert gas, e.g. nitrogen. Temperatures of 250°–280° C. may be used for the polymerization under anhydrous conditions.

If desired polymerization may be carried out by the process of the invention in the presence of monofunctional compounds which, by acting as chain stoppers, control the molecular weight of the product. Monobasic carbonic acids, e.g. acetic acid or stearic acid may be used. Certain amides may also be used as monofunctional compounds, as will be indicated below.

When polymerization has been effected the product may be washed with water or methanol to remove unreacted monomer and catalyst. Washing effects an apparent increase in molecular weight of the polymer, as determined by solution viscosity measurements. It is evident, therefore, that the process of the invention yields products which do not contain catalyst linked to end groups in the same way as phosphoric acid catalyst becomes linked to the polymer. For this reason the process gives more consistent results than the corresponding process in which phosphoric acid is used, and the properties of the products are less dependent upon strict control of conditions.

According to a further feature of the invention a preferred process for the polymerization of dodecanolactam comprises heating dodecanolactam in the presence of an organic sulfonic acid and an N-substituted amide, especially an N-substituted amide of the formula:

$$R_1 CO NH R_2$$

wherein $R_1$ and $R_2$ each represent alkyl, cycloalkyl or aryl radicals and may be the same or different.

Examples of aryl radicals which may be represented by $R_1$ in the above formula are phenyl, p-tolyl and β-naphthyl. Similarly examples of alkyl radicals are methyl, ethyl, n-propyl, n-butyl and an example of a cycloalkyl radical is cyclohexyl.

Specific examples of amides of the above formula include acetanilide, benzanilide, N-butylbenzamide and N-acetylbutylamine.

Especially preferred amides are those in which one of the radicals $R_1$ and $R_2$ is an aryl radical, the other being aryl, alkyl (especially lower alkyl, that is to say an alkyl radical of not more than 5 carbon atoms) or cycloalkyl.

In the preferred process of our invention the amide acts as a chain stopper and effectively controls the degree of polymerization which is achieved. To produce polydodecanolactam suitable for spinning into fibers, or for use as a molding material, the amount of amide used should be from 1.0 to 5.0 moles (preferably from 0.25 to 1.5) percent of the dodecanolactam. Higher amounts of amide reduce the molecular weight of the polydodecanolactam so much that the product is no longer useful for the production of fibers, and lower amounts lead to products of such high molecular weights as to cause extrusion difficulties.

As a measure of the degree of polymerization produced by the process of the invention, we have relied upon determinations of the relative viscosity of a 1 percent by weight solution of the methanol-extracted polymer in m-cresol at 25° C. In order for polydodecanolactam to be useful for spinning into fibers it is desirable that the relative viscosity of the methanol extracted polymer in m-cresol should be within the range 1.8 to 3.4 and that the percentage by weight of methanol-extractable material in the crude polymer should be less than 5 percent, preferably less than 1 percent.

The invention is illustrated but not limited by the following examples in which the parts and percentages are by weight:

EXAMPLE 1

70 Parts of dodecanolactam, 0.7 parts of p-toluene sulfonic acid and 4 parts of toluene were charged into a polymer tube (a "Pyrex" tube 38 cms. long and 4 cms. in diameter). The tube was fitted with a head carrying a stirrer, a nitrogen lead and a distillation arm. The reactants were then heated in a dimethyl phthalate vapor bath (282° C.) for 6 hours under nitrogen and then allowed to cool under nitrogen. The polymer had the following characteristics:

| | |
|---|---|
| Relative viscosity | 3.61 |
| Methanol extractable material | 1.7% |
| Relative viscosity after extraction with methanol | 3.88 |
| Relative viscosity after extraction with water | 3.70 |

Comparative polymer made by a similar procedure using orthophosphoric acid as catalyst had the following characteristics:

| | |
|---|---|
| Relative viscosity | 3.1 |
| Methanol extractable material | 2.4% |
| Relative viscosity after extraction with methanol | 2.9 |
| Relative viscosity after extraction with water | 3.01 |

Relative viscosities were measured at 25° C. using a 1 percent solution in m-cresol.

Table I summarizes the characteristics of polymers obtained by the procedure of Example 1, with variations as indicated.

TABLE I

| Example | Catalyst | Parts | Temp. (° C.) | Time (hours) | Methanol extractable | Rel. viscosity of extracted material |
|---|---|---|---|---|---|---|
| 2 | p-toluenesulphonic acid | 1.05 | 280 | 6 | <1 | 3.5 |
| 3 | do | 0.2 | 280 | 6 | 25 | 5.55 |
| 4 | do | 0.35 | 280 | 6 | 0.9 | 5.24 |
| 5 | do | 0.7 | 250 | 6 | 41 | 3.23 |
| 6 | do | 0.7 | 300 | 4 | 0.9 | (¹) |
| 7 | β-naphthylsulphonic acid | 0.7 | 280 | 6 | 0.3 | 4.81 |
| 8 | Cyclohexylsulphonic acid | 0.7 | 280 | 6 | 0.8 | 4.90 |
| 9 | Ethylsulphonic acid | 0.7 | 280 | 6 | 0.8 | (¹) |

¹ Insoluble.

In Example 6 only 10 parts of toluene was used so that a temperature of 300° C. could be obtained.

EXAMPLE 10

Example 1 was repeated using 5 parts of water in place of 40 parts of toluene. The polymer had the following characteristics:

| | |
|---|---|
| Methanol extractable material | 1.5% |
| Relative viscosity, after extraction | 4.2 |

Table II summarizes the characteristics of polymers obtained by the procedure of Example 1, using 0.7 parts of catalyst in each case and chain stoppers as indicated.

TABLE II

| Example | Catalyst | Chain stopper | Moles (percent) | Methanol-extractable (percent) | Rel. viscosity of extracted material |
|---|---|---|---|---|---|
| 11 | Ethylsulphonic acid | Stearic acid | 0.75 | 1.0 | 2.71 |
| 12 | do | acetanilide | 0.75 | 1.1 | 2.94 |
| 13 | p-Toluene sulphonic acid | n-Butylbenzamide | 1.2 | <1.0 | 2.53 |
| 14 | do | Benzanilide | 0.5 | 1.9 | 2.73 |
| 15 | do | Benzoylpiperidine | 0.5 | 10.9 | 4.28 |
| 16 | do | Acetanilide | 0.5 | 2.1 | 4.5 |
| 17 | do | do | 1.5 | 1.7 | 2.1 |
| 18 | do | do | 1.0 | 1.8 | 2.6 |

NOTE.—In Example 15 a temperature of 250° C. was used.

EXAMPLE 19

Polymerization of dodecanolactam was carried out in an autoclave fitted with electrical heating, nitrogen inlet, stirrer and offtake. Dodecanolactam (1,584 pts.), p-toluene sulfonic acid (15.8 pts.), acetanilide (8.1 pts.) and water (100 pts.) were charged and the autoclave was sealed and heated. At 280° C. the pressure was released slowly during 45 minutes down to atmospheric. A nitrogen blanket was maintained and the heating was continued for 7 hours at 280° C. The product was extruded into ribbon. It contained 2.5 percent of methanol-extractable material and had a relative viscosity of 2.27 after extraction. This product was suitable for spinning into fibers.

We claim:

1. A process for the polymerization of dodecanolactam which comprises heating dodecanolactam to its polymerization temperature in the presence of a catalytic amount of a hydrocarbon monosulfonic acid selected from the group consisting of arylsulfonic acids, alkylsulfonic acids and cycloalkylsulfonic acids.

2. Process according to claim 1 wherein the amount of sulfonic acid is from 0.1 to 3 percent by weight of the dodecanolactam.

3. Process according to claim 1 carried out in the presence of water and at a temperature of from 280° to 300° C.

4. Process according to claim 1 carried out under anhydrous conditions and at a temperature of from 250° to 280° C.

5. The process according to claim 1 carried out in the presence of an N-substituted amide chain stopper of the formula $R_1 CO NH R_2$ wherein $R_1$ and $R_2$ are independently selected from the group consisting of alkyl, cycloalkyl, or aryl radicals.

6. The process according to claim 5 wherein said N-substituted amide is an amide wherein one of said radicals $R_1$ and $R_2$ is an aryl radical and the other radical is aryl, alkyl or cycloalkyl radical.

7. Process according to claim 5 wherein the said N-substituted amide is acetanilide, benzanilide, N-butylamide or N-acetylbutylamine.

8. Process according to claim 5 wherein the amount of amide is from 0.1 to 5.0 moles percent of the dodecanolactam.

9. Process according to claim 5 wherein the amount of amide is from 0.25 to 1.5 moles percent of the dodecanolactam.